United States Patent [19]

Suzuki

[11] Patent Number: 4,809,656

[45] Date of Patent: Mar. 7, 1989

[54] ACTUATOR FOR AUTOMATIC CRUISING SYSTEM

[75] Inventor: Kazuhiro Suzuki, Nishinomiya, Japan

[73] Assignee: Nippon Cable System Inc., Hyogo, Japan

[21] Appl. No.: 38,119

[22] Filed: Apr. 14, 1987

[51] Int. Cl.[4] ........................ F02D 11/10; F02D 41/04
[52] U.S. Cl. ..................................... 123/361; 123/379; 180/179
[58] Field of Search ........................ 123/352, 361, 399; 180/178, 179; 74/714, 785

[56] References Cited

U.S. PATENT DOCUMENTS

| 3,392,799 | 7/1968 | Ishikawa | 180/178 |
| 4,385,675 | 5/1983 | Blee | 180/178 |
| 4,714,864 | 12/1987 | Yogo et al. | 123/361 |

FOREIGN PATENT DOCUMENTS 193466  9/1986  European Pat. Off. ............ 180/179

59-165836  9/1984  Japan .................................. 123/361

Primary Examiner—Tony M. Argenbright
Assistant Examiner—Eric R. Carlberg
Attorney, Agent, or Firm—Armstrong, Nikaido, Marmelstein & Kubovcik

[57] ABSTRACT

An actuator for an automatic cruising system comprising a control shaft rotatably provided in a casing, an electromagnetic clutch connected to the control shaft at input side thereof, a Ferguson's type reduction gear having a static internal gear the rotation of which is restricted or permitted according to on-off operation of the electromagnetic clutch, a pinion connected to a motor, a rotary internal gear fixed to the control shaft, and an external linkage mechanism having an output drum for transmitting the motion of the control shaft through an output cable and an input drum for receiving and transmitting an acceleration signal provided by the accelerator pedal through an input cable with the accelerator signal overriding the motor's motion.

8 Claims, 3 Drawing Sheets

… …

ACTUATOR FOR AUTOMATIC CRUISING SYSTEM

BACKGROUND OF THE INVENTION

The present invention relates to an actuator for an automatic cruising system.

Recently, there has been provided an improved automatic cruising system which controls the speed of an automobile at a constant level even though the driver releases an accelerator pedal, when the driver drives the automobile on a highway or the like. The present invention relates to an actuator in such an automatic cruising system, which receives a control signal from an electric controller (for example, having a micro computer) or from an accelerator such as an accelerator pedal, and operates a regulator for an automobile engine, e.g. a throttle valve regulator or throttle valve governor.

Generally, an automatic cruising system provided on an automobile has, for example, a fundamental construction as shown in FIG. 4.

A controller 1 generates an acceleration and/or deceleration control signals to keep the cruising speed at a constant level preset by the driver and provides the acceleration and/or deceleration control signals and other control signals for preventing a breakdown or uncontrollable driving as an electric signal to an actuator 3.

Though, hereinafter, an automobile having an accelerator pedal as an accelerator device and a throttle valve as an engine output regulator will be explained as a typical case, the actuator of the present invention, of course, can be employed in various types of vehicles including a motorcycle having an accelerator grip, an automobile provided with a fuel injection device, and the like.

In general, the controller 1 comprises a computer and peripheral units. The pedal operation is transmitted to the actuator 3 through a control cable as a mechanical signal. The actuator 3 receives input signals from the controller 1 and/or from the accelerator pedal 2, and gives an output signal to a throttle valve governor 4. The throttle valve govenor 4 is a device for governing the throttle valve in accordance with the output signal from the actuator 3, and thereby the throttle valve governor 4 selectively accelerates or decelerates the output of the engine, or keeps the output of the engine of a certain constant level.

In an automatic cruising system having the above-mentioned fundamental structure, the actuator 3 is normally subject to the control signal from the controller 1 during usual cruise conditions. However, when the driver depresses the accelerator pedal 2 to accelerate the automobile, the throttle valve governor 4 needs to be operated by the output signal from the accelerator pedal 2 rather than the signal from the controller 1. Further, when the driver releases the accelerator pedal 2, the governor 4 needs to be operated by the control signal from the controller 1 again.

The actuator 3 is required to have the above-mentioned functions and further to provide a compact body to conserve space in the automobile.

Though, hitherto, various typs of actuators have been known, in those conventional actuators, the mechanism for driving the control cable for output signal and the mechanism for driving the output control cable in accordance with the input signal from the accelerator pedal prior to the signal from the controller, i.e. an accelerator linkage mechanism, and the like are complicated. Therefore, the accelerator linkage mechanism is usually separated from the main construction of the actuator, and therefore the cable-driving devices, e.g. drums, are double necessary and the system becomes further complicated.

Accordingly, the conventional actuators do not satisfy the requirement of compact design in comparison with other functional parts or units of an automobile which are improved for space saving by various mechanical and electronic (mechatronic) means.

A main object of the present invention is to provide an actuator for an automatic cruising system which satisfies all necessary functions, and in addition, has a small body size.

SUMMARY OF THE INVENTION

According to the present invention, there is provided an actuator for an automatic cruising system, comprising a casing, a control shaft provided in the casing for rotational movement, a control motor for driving the control shaft, an input shaft, an electromagnetic clutch and a reduction gear which are provided between the control motor and the control shaft, and an external linkage mechanism operatively connected to the control shaft. The above mentioned reduction gear is a type of Ferguson's mechanical paradox gear having a pinion mounted on the input shaft which is always connected to the control motor, a planetary gear meshing with the pinion so as to revolve around the pinion, a static internal gear meshing with the planetary gear and being connected with the electromagnetic clutch for restriction of rotation, and a rotary internal gear being fixed on the control shaft, meshed with the planetary gear and having a number of teeth which is slightly different from the number of teeth of the static internal gear. Further, the above mentioned electromagnetic clutch has a tubular electromagnetic coil coaxially provided around the input shaft and an engaging means for engaging and disengaging with the static internal gear in accordance with on-off operation of the electromagnetic coil.

Further, according to the present invention, there is provided an actuator for an automatic cruising system, comprising a casing, a control shaft provided in the casing for rotational movement, a control motor for driving the control shaft, an electromagnetic clutch and a reduction gear which are provided between the control motor and the control shaft, and an output linkage mechanism which is operationally connected to the control shaft. The above mentioned output mechanism comprises an output linkage drum rotatably mounted on the control shaft and adapted to be linked with a governing device for an engine through an output cable and an input drum rotatably mounted on the control shaft at a position adjacent to the output drum and adapted to be linked with an accelerator device through an input cable. The output linkage mechanism also includes a set of first engaging means comprising a first engaging piece radially extending from the control shaft and a first contacting portion provided on the output drum which engage with each other when a control shaft is rotated in the normal direction to accelerate the engine and disengage when the control shaft is rotated in the reverse direction, a set of second engaging means comprising a second abutting piece provided on the output drum and a second abutting portion provided on the input drum which engage with each other when the input drum is rotated in the normal direction and disengage when the input drum is rotated in the reverse direction, a first return spring urging the output drum to rotate in the reverse direction and a second return spring urging the input drum to rotate in the reverse direction.

The function and operation of the actuator and the automatic cruising system will be described hereinafter.

When the electric control motor is rotated in the normal or reverse direction in accordance with the control signal from the controller, the rotation is reduced through the reduction gear, and the control shaft rotates by a certain angle in the normal (accelerating) or reverse (decelerating) direction.

When the control shaft rotates in the normal direction, the output drum is rotated in the normal direction through the first engaging means to pull the output cable in the accelerating direction. The throttle valve governor is thereby operated in such direction that the throttle valve is opened. When the control shaft reversely rotates, the output drum becomes free from the engagement with the first abutting piece, and therefore, the throttle valve is throttled down by means of, for example, a return spring provided in the governor throttle valve governor.

Since the above-mentioned acceleration and deceleration operations of the actuator are performed always or on occasion in accordance with the control signal from the controller, the cruising speed of the automobile is constantly maintained by adjusting the governor throttle valve governor in accordance with change in the wind or road resistance, and thus, the automatic cruising control is realized.

During constant speed cruising, when the driver depresses the accelerator pedal in order to accelerate the speed from the preset cruising speed, the operation is transmitted to the input drum via the accelerator cable or input cable. Therefore the input drum is rotated in the normal direction and the rotational motion is transmitted to the output drum through the second engaging means to rotate the output drum in the normal direction. Since the normal rotation of the output drum is transmitted to the governor in order to open the throttle valve, the automobile is accelerated in accordance with the angle of the accelerator pedal operated by the driver.

When the driver depresses a brake pedal or a clutch pedal in order to decelerate the automobile, the electromagnetic clutch becomes "off" and the first abutting piece or lever is reversely rotated by means of the first return spring. Therefore, the output drum can freely rotate since restriction due to the first abutting piece is cancelled and the throttle valve is throttled down or closed by the return spring in the throttle valve governor to decelerate the automobile.

As mentioned above, the actuator of the present invention provides for constant speed control and acceleration and deceleration of an automobile during constant speed cruising.

The actuator of the present invention having a Ferguson's type reduction gear provides advantages in that the reduction ratio is very large, the input shaft cannot be rotated from the output side due to the one way transmission function of the Ferguson's type of reduction gear, and the engaging and disengaging operations can be continuously and smoothly performed even if the motor does not perfectly stop.

In the actuator of the present invention, there is employed a construction where the output drum and the input drum are freely and rotatably mounted on the control shaft regardless of the rotation of the control shaft. Therefore, the output drum and the input drum can be arranged adjacent to one another on the same shaft to reduce the axial length of the actuation.

Further, since both the first and second return springs have ring-like shapes, the return springs can be arranged coaxially around the control shaft. Therefore, the surrounding space of the control shaft can be effectively utilized to achieve the desired reduction in size of the actuator.

Hereinafter an embodiment of the present invention will be described with reference to the accompanying drawings mentioned below.

DETAILED DESCRIPTION OF THE INVENTION

Figure 4:
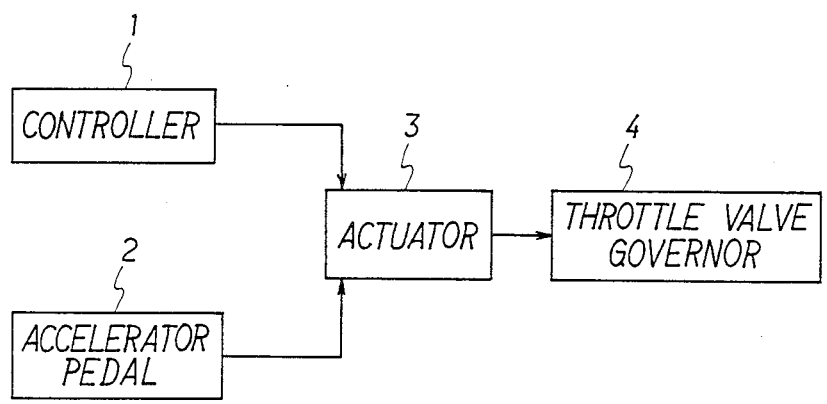
FIG. 4 is a block diagram showing an example of an automatic cruising system employing an actuator of the present invention.

As shown in FIG. 4, an actuator 3 of the present invention receives a control signal from a controller 1 and an operation signal from an accelerator pedal 2 as input signals and gives an output signal to a governor 4 for a throttle valve.

Hereinafter, construction of the actuator 3 is explained with reference to FIG. 1.

Figure 1:
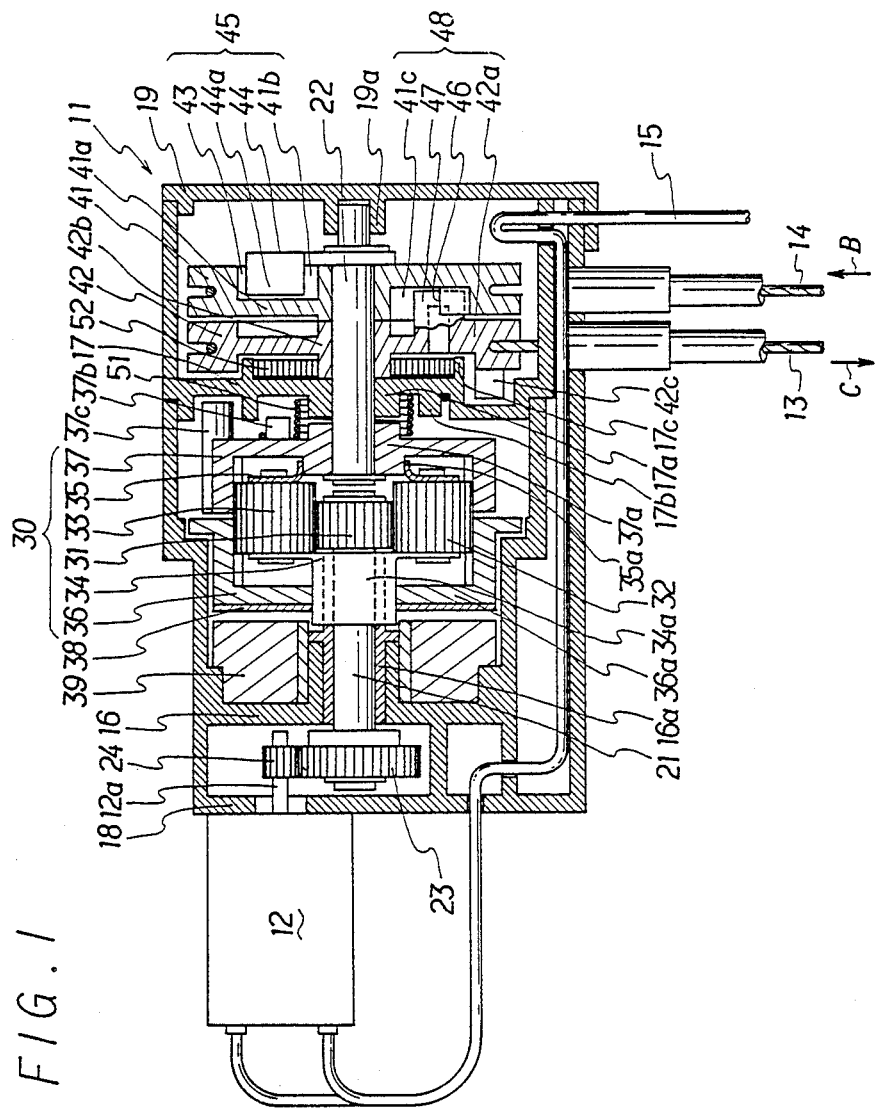
FIG. 1 is a sectional view showing an embodiment of the actuator of the present invention, where the electromagnetic clutch is turned to "off" and the driving force of the motor is not transmitted to the control shaft.

In FIG. 1, numeral 11 is a casing of the actuator 3, numeral 12 is an electric control motor capable of rotating in a normal or reverse direction in accordance with the control signal from the controller 1, numeral 13 is an accelerator control cable or input cable arranged between the actuator 3 and the accelerator pedal 2, and the numeral 14 is an output control cable or output cable arranged between the actuator 3 and the throttle valve governor 4. Both control cables 13 and 14 are pull control cables.

The control motor 12 receives an electric signal from the controller 1 through a lead wire 15 and rotates by a certain number of revolutions in accordance with an order value of the control signal from the controller 1.

The casing 11 has two walls 16, 17 inside thereof and walls 18, and 19 at their outer ends. A transmission shaft or input shaft 21 is rotatably supported on a long boss 16a formed with the wall 16. A control shaft 22 is rotatably supported on a boss 17a of the wall 17 and a boss 19a of the wall 19. A gear 23 is fixed on the rear end (left side end in FIG. 1) of the input shaft 21, and a pinion 24 fixed on the output shaft 12a of the control motor 12 mates with the gear 23. Therefore, when the control motor 12 rotates, the input shaft 21 is rotated by a number of revolutions which is reduced by the gear 23 and pinion 24, for example, to 1/5 the number of revolutions of the control motor 12.

At the front end (right side end in FIG. 1) of the input shaft 21, an internal gear type of reduction gear 30 is provided.

A detailed description of the reduction gear is now provided.

On the front end of the input shaft 21, a pinion or sun gear 31 is fixed. The sun gear 31 may be formed on the peripheral surface of the input shaft 21. The sun gear 31 meshes with a pair of planetary gears 32, 33 which are supported on common carriers 34, 35 in axial symmetrical positions with respect to the axis of the sun gear 31. The carrier 34 has a long boss 34a which is rotatably mounted on the long boss 16a mounting the input shaft 21. The carrier 35 has a supporting portion rotatably supported on the boss 37a of the rotary internal gear 37.

Figure 2:
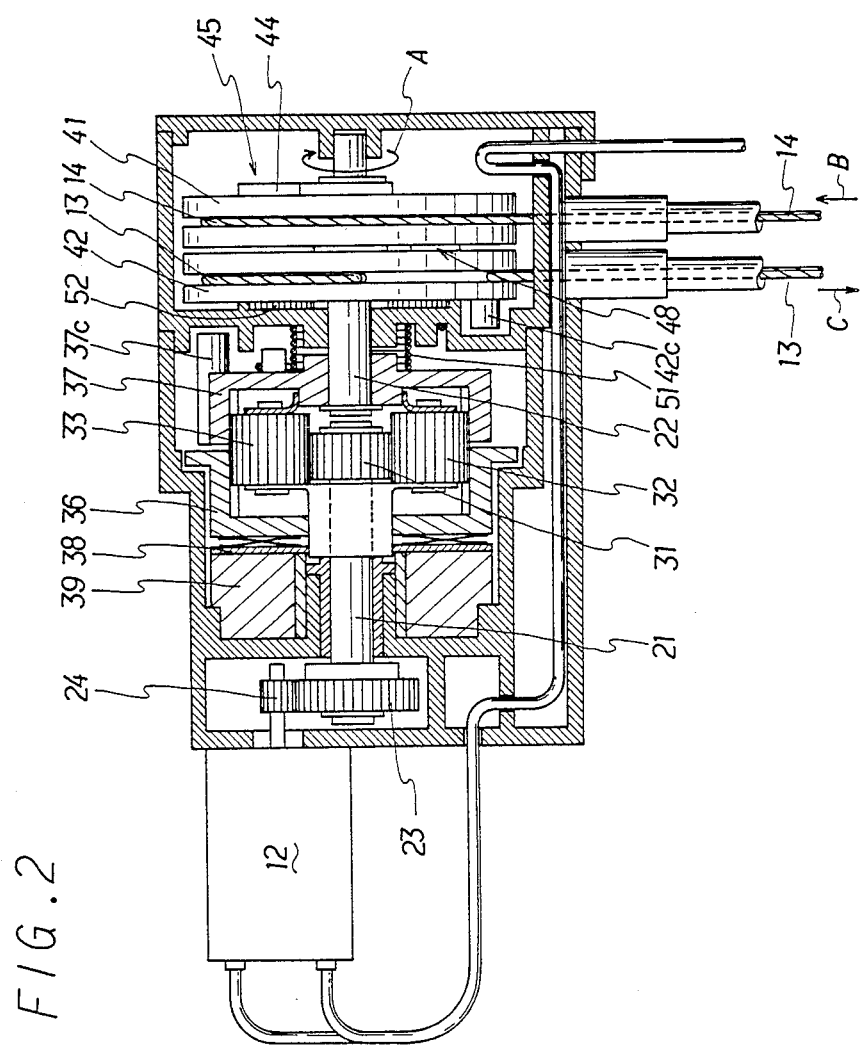
FIG. 2 is a sectional view corresponding to FIG. 1, where the electromagnetic clutch is turned to "on" and the driving force of the motor is transmitted to the control shaft.

A ring-shaped input or static internal gear 36 is arranged around the planetary gears 32, 33 so that the gear 36 mates with the gears 32, 33. The periphery of the ring portion 36a of the internal gear 36 is slidably supported on the inner peripheral face of the casing 11. On the back side of the ring portion 36a, a disk-like clutch plate or clutch disk 38 is floatably supported on ends of a set of leaf springs. The other ends of the leaf springs are fixed on the static internal gear 36. An electromagnetic coil 39 is provided between the clutch disk 38 and the wall 16, so that the electromagnetic coil 39 attracts the clutch disk 38, as shown in FIG. 2, when the electromagnetic coil 39 is electrified in accordance with an order signal from the controller 1. Then, a set of engaging projections provided on the side surface of the electromagnetic coil 39 and another set of engaging projections or recessed portions provided on the surface of the clutch disk 38 are engaged with each other, to restrict the rotational motion of the static internal gear 36.

In one case a dog clutch or a jaw clutch may be employed as the above-mentioned combination of sets of engaging projections.

In another case where a combination of a set of engaging projections and a set of engaging recesses are employed, a plural of (e.g. two to six) engaging pins each having a tapered end portion and a number (e.g. forty to eighty) of recessed portions having a tapered shape and being arranged on an imaginary circle coaxial with the input shaft 2 may be employed.

When electric current to the electromagnetic coil 39 is turned off in accordance with the order signal from the controller 1, as shown in FIG. 1, the clutch disk 38 is separated from the electromagnetic coil 39, by means of the leaf springs, and the static internal gear 36 becomes free for rotation.

An output or rotary internal gear 37 meshing with the above-mentioned planetary gears 32, 33 is arranged opposite to the static internal gear 36. The rotary internal gear 37 has a boss 37a fixed on the end (left side end in FIGS. 1 and 2) of the control shaft 22. The number of the teeth of the rotary internal gear 37 is different from that of the static internal gear 36 by a few (e.g. two to ten) teeth. That is to say, the above-mentioned reduction mechanism constructs a Ferguson's mechanical paradox type reduction gear.

Therefore, when the electromagnetic coil 39 attracts the clutch disk 38, the planetary gears 32, 33 revolve around the input shaft 21 due to the rotation of the input shaft 21, since the static internal gear 36 cannot rotate. Rotation of the rotary internal gear 37 is therefore greatly reduced and drives the control shaft 22 to rotate at a reduced number of revolutions, e.g. 1/108 relative to the number of revolutions of the input shaft 21.

As mentioned above, with total reduction ratio of about 1/540, the control shaft 22 is rotated, for example, at 48 degree/second in angular velocity.

The actuator 3 of the present embodiment is designed so that the control shaft 22 is rotatable in a predetermined angle, e.g. 75 degree, in maximum. In order to enable such function, a stopper 37c is provided on the rim portion of the rotary internal gear 37 so that the stopper 37c abuts against a stopper portion of the wall 17.

Next, the construction around the control shaft 22 will be explained.

On the front end side (right end side in FIG. 1) of the control shaft 22, an output drum 41 is mounted. Further, an input drum 42 is mounted on the control shaft 22 and is inserted between the output drum 41 and the wall 17. The output drum 41 and the input drum 42 are rotatable freely around the control shaft 22.

Figure 3:
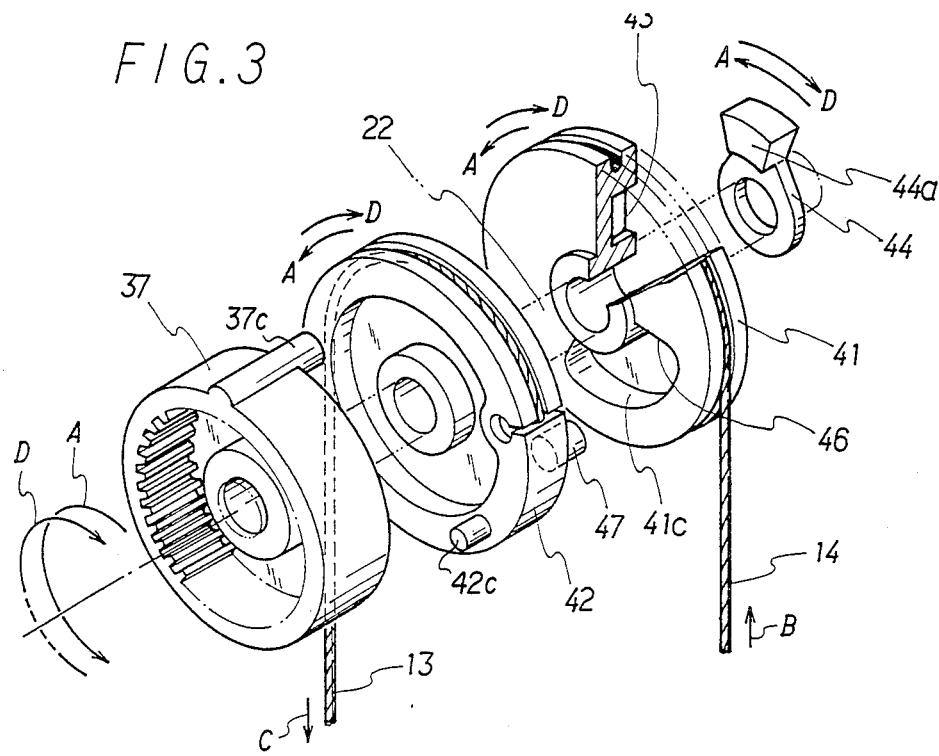
FIG. 3 is a partial perspective view showing an embodiment of the actuator of the present invention.

An output cable 14 is wound around the output drum 41 as shown in FIGS. 2 and 3, so that the output cable 14 is pulled in the direction of Arrow B when the output drum 41 is rotated in the direction of Arrow A. When the output cable 14 is pulled in the direction of Arrow B, the throttle valve governor 4 of FIG. 4 is operated to open the throttle valve.

Further an accelerator cable 13 is wound around the input drum 42, so that the accelerator cable 13 is pulled in the direction of Arrow C to rotate the input drum 42 in the direction of Arrow A when the accelerator pedal 2 is operated. The ends of the cables 14, 13 are anchored to the drums 41 and 42, respectively.

An arc-shaped groove 41b is formed in a side surface of a rib 41a of the above-mentioned output drum 41, and the groove 41b extends in a range of, for example, 75 degrees around the rotational center of the output drum 41. A standing wall portion at the end of the groove 41b is a first abutting portion 43.

On the other hand, a first abutting piece 44 is provided with a projection 44a for abutting with the first abutting portion 43 at the free end thereof. When the control shaft 22 is rotated in the normal direction (i.e. in the direction of Arrow A in FIG. 3), the first abutting piece 44 abuts against the first abutting portion 43 to rotate the output drum 41 in the normal direction (Arrow A). When the control shaft 22 is rotated in the reverse direction (Arrow D), the first abutting piece 44 moves along the arc-shaped groove 41b. Therefore the output drum 41 becomes free for rotation and is rotated in the reverse direction (Arrow D), for example, by means of a return spring in the throttle valve governor.

As mentioned above, there is provided a first engaging means 45 comprising the first abutting portion 43 and the first abutting piece 44.

Further, another arc-shaped or fan-shaped groove 41c is formed in another side surface of the rib 41a of the output drum 41. The groove 41c extends in a range of, for example, 75 degree around the rotational center of the output drum 41, and an end wall of the groove 41c is a second abutting portion 46.

Further, the rib 42a of the input drum 42 is provided with a projection inserted into the groove 41c as a second abutting piece 47. Therefore, when the input drum 42 is rotated in the normal direction (Arrow A), the second abutting piece 47 pushes the second abutting portion 46 to rotate the output drum 41 in the direction of Arrow A. When the input drum 42 is rotated in the reverse direction (Arrow D), the second abutting piece 47 freely moves along the groove 41c. Then the drum 41 becomes free for rotation and is reversely rotated in the direction of Arrow D by means of, for example, the return spring in the throttle valve governor.

As described above, there is provided a second engaging means 48 comprising the second abutting portion 46 and the second abuttig piece 47 between the output drum 41 and the input drum 42.

In addition, on the back surface of the input drum 42, a stopper 42c is formed for limiting the rotation of the input drum 42 in a certain angle, for example, 75 degree. The stopper 42c abuts against a stopper portion of the wall 17 when the input drum 42 rotates to the end thereof.

A torsional coil spring or first return spring 51 is inserted between the rotary internal gear 37 of the reduction gear 30 and the wall 17. The first return spring 51 urges the control shaft 22 and therefor the output drum 41 in the reverse direction of Arrow D. The first return spring 51 has a ring-shaped form and is coaxially arranged around the control shaft 22.

The first return spring 51 has an end engaged with a projection 17b formed on the wall 17 and the other end engaged with a projection 37b formed on the rib of the rotary internal gear 37.

Therefore, when electric current to the electromagnetic coil 39 is turned off to disengage the clutch disk 38, the rotary internal gear 37 is reversely rotated by means of the first return spring 51 since the rotary internal gear 37 is free for rotation, and therefore, the control shaft 22 and the first abutting piece 44 are also reversely rotated to the original rest position.

Between the wall 17 and the input drum 42, a spiral spring or second return spring 52 is inserted. The second return spring 52 has an end anchored to the boss 42b of the input drum 42 and the other end anchored to a ring-shaped projection 17c on the wall 17.

Accordingly, when tension of the accelerator cable 13 becomes loose, i.e. when a depressing force applied against the accelerator pedal by the driver is released, the input drum 42 is rotated in the reverse direction by the urging force of the second return spring 52 to wind the accelerator cable 13 and ensure the return of the accelerator pedal 2 to the original position thereof.

According to the above-mentioned construction, when the control motor 12 rotates in the normal direction, the control shaft 22 and the first abutting piece 44 are rotated to increase the rotary angle in the range of 0 (original position) to 75 (end position) degree, so that the first drum 41 is rotated in the normal direction to the required rotary angle. When the control motor 12 is rotated in the reverse direction, the control shaft 22 and the first abutting piece 44 are rotated to decrease the rotary angle thereof in the range between the original position and the end position, so that the output drum 41 can return to the required angular position.

On the other hand, in a space between the wall 19 of the casing 11 and the output drum 41, limit switches can be provided. The limit switches are used for sensing a position of the abutting piece 44 in order to prevent over-rotation of the output drum 41.

Hereinafter, the function and operation of the above-mentioned actuator is explained together with that of the automatic cruising system.

The actuator 3 controls (a) acceleration; and (b) deceleration of an engine in order to keep a constant speed of an automobile in accordance with the control signal from the controller 1 which detects a change in resistance to cruising. The actuator 3 further (c) cancels the normal constant speed operation and accelerates the engine in accordance with the driver's accelerator pedal operation; and (d) cancels the constant speed operation and decelerates the engine.

Hereinafter, those functions of the actuator 3 are described in the above-mentioned order.

(a) Acceleration of engine for constant speed cruising:

During the constant speed control, the electromagnetic coil 39 is turned on, and the electromagnetic coil 39 attracts the clutch disk 38 as shown in FIG. 2. Therefore, the static internal gear 36 is secured against rotation, and the rotary internal gear 37 is prepared to be rotated by the control motor 12.

In case the engine should be accelerated, the control motor 12 is rotated in the normal direction by a number of revolutions in accordance with the control signal from the controller 1. The normal rotation is transmitted to the pinion 24 and further to the gear 23, and rotates the input shaft 21 at a primary reduced number of revolutions. Then the rotation of the input shaft 21 is transmitted to the sun gear 31, the planetary gears 32, 33 and the rotary internal gear 37, in that order. The control shaft 22 is thereby rotated in the normal direction at a final number of revolutions with a reduction ratio of about 1/540.

The rotation of the control shaft 22 in the normal direction is transmitted to the output drum 41 via the first engaging means 45 to rotate the output drum 41 in the normal direction, and the output cable 14 is pulled in the direction of Arrow B.

Therefore, the throttle valve governor 4 acts to open the throttle valve of the engine. The rotary angle of the output drum 41 is regulated to a required angle in a range from 0 to 75 degree by setting the number of revolutions or period of rotation of the control motor 12. Therefore, the open angle of the throttle valve is optionally regulated to accelerate the engine.

After the acceleration of the engine, electric current to the control motor 12 is turned off. However, since reverse rotation of the control shaft is restricted due to the one way transmitting function of the Ferguson's mechanical paradox type gear, the output drum 41 never reversely rotates from the previously set position.

(b) Deceleration of engine for constant speed cruising:

In case the engine should be decelerated, the control motor 12 is reversely rotated by a number of revolutions in accordance with the control signal from the controller 1. The reverse rotation is transmitted to the pinion 24, to the input shaft 21, and further to the control shaft 22 through the internal gear type of reduction gear 30, in the same manner as described in the above-mentioned case (a).

When the control shaft 22 is rotated in the reverse direction to a required rotary angle, the first abutting piece 44 is also rotated to the same angle. Therefore the output drum 41 is reversely rotated by a return spring or the like provided in the throttle valve governer so that the output drum 41 is returned until the first abutting portion 43 thereof abuts against the first abutting piece 44. Then the throttle valve is throttled down, and the engine is decelerated.

The above-mentioned operations of acceleration (a) and deceleration (b) of the engine are automatically performed as occasion calls in accordance with the order from the controller 1 in response to the change of resistance against automobile's cruising.

(c) Temporary acceleration in the constant speed cruising condition:

In the constant speed cruising under the control of the controller 1, when the driver depresses the acceleration pedal to temporarily accelerate the automobile, the motion of the accelerator pedal 2 is transmitted to the input drum 42 through the accelerator cable 13 and the input drum 42 is normally rotated.

The normal rotation is transmitted to the output drum 41 through the second engaging means 48, and the output drum 41 is rotated in the normal direction from the position set by the controller 1. Therefore the output cable 14 is pulled, and then the throttle valve is opened.

As described above, in the automobile under constant speed cruising, the control operation by the controller 1 is cancelled, and acceleration is performed.

When the driver releases the accelerator pedal 2 in order to stop the temporary acceleration, the input drum 42 is reversely rotated by means of the second return spring 52, and the accelerator pedal 2 is returned to the original position. Then the output drum 41 becomes free for rotation. Accordingly, the throttle valve is throttled down by a return spring in the throttle valve governor, and, at the same time, the output drum 41 which receives the force of the same return spring through the output cable 14 returns until the first abutting portion 43 abuts against the first abutting piece 44. The number of revolutions of the engine then returns to the former level which has been set by the controller 1, and the automobile returns to the former condition of constant speed cruising.

(d) Temporary deceleration in constant speed cruising:

In case the driver depresses a brake pedal or a clutch pedal in order to decelerate the automobile, the electric current to the electromagnetic coil 39 is turned off by means interlocking with the depressing operation, and the first abutting piece 44 is reversely rotated by the first return spring 51 to the original position where the rotary angle is 0 degree.

Therefore, as in the case of (b) mentioned above, the throttle valve is throttled down and the engine comes to an idling state.

Further, when the driver releases the brake pedal or the accelerator pedal again, interlocking with such operation, the electromagnetic clutch is turned on and the control motor 12 is rotated in the normal direction to the previous position where the cancelling of controller 1 is not effected. As described above, automatic cruising at constant speed can be obtained again.

As described above, the open-close operation of the throttle valve for automatic acceleration or deceleration of the engine to keep a vehicle cruising at constant speed and for temporary acceleration or deceleration during the constant speed cruising can be surely performed by the actuator of the present invention.

Hereinafter, advantages in the space design of the above-mentioned actuator are explained.

In the actuator 3, since both the output drum 41 and input drum 42 are mounted on the control shift 22 such that they are freely rotatable relative to the control shaft 22, the output drum 41 and the input drum 42 can be mounted coaxial and adjacent to each other. Therefore, the size of the actuator in the direction of the length of the control shaft is reduced.

Further, since both the first return spring 51 and the second return spring 52 have ring-shaped forms, the springs 51, 52 can be coaxially arranged around the control shaft 22. Therefore, the springs 51, 52 can be compactly contained by utilizing the space around the control shaft 22.

The above-mentioned actuator 3 having the input drum 42 is a type of actuator provided with an acceleration linkage mechanism.

In the actuator of the present invention, the operation of the throttle valve for constant speed cruising can be surely performed, and a space saving design is provided.

Though preferred embodiments of the present invention are described above, it is to be understood that the present invention is no limitted to the above-described embodiments, and various changes and modifications may be made in the invention without departing from the spirit and scope thereof.

What we claim is:

1. An actuator for an automatic cruising system, comprising:

a casing;

a control shaft provided in said casing for rotational movement;

a control motor for driving said control shaft;

an input shaft, an electromagnetic clutch and a reduction gear which are provided between said control motor and said control shaft; and an external linkage mechanism operatively connected to said control shaft;

wherein said reduction gear is a type of Ferguson's mechanical paradox gear having a pinion mounted on said input shaft always connected to said control motor;

a planetary gear meshing with said pinion so as to revolve around said pinion;

a static internal gear meshing with said planetary gear and connected with said electromagnetic clutch for movement to a position restricting rotation of said static internal gear; and a rotary internal gear fixed on said control shaft and meshed with said planetary gear, said rotary internal gear having a number of teeth slightly different from a number of teeth of said static internal gear; and said electromagnetic clutch has a tubular electromagnetic coil coaxially provided around said input shaft and an engaging means for engaging and disengaging with said static internal gear in accordance with on-off operation of said electromagnetic coil.

2. The actuator of claim 1, wherein said engaging means of said electromagnetic clutch comprises a plurality of engaing pins coaxially arranged around said input shaft and a number of engaging recesses engageable with said pins.

3. The actuator of claim 2, wherein said engaging pins have tapered ends and said engaging recesses each have a shape engageable with one of said tapered ends.

4. The actuator of claim 1, wherein said external linkage mechanism comprises, an output drum rotatably mounted on said control shaft so that said control shaft engages with said output drum only when said control shaft is rotated in a normal direction, an output cable linking said output drum with a regulator for engine output, said output cable being wound around said output drum to accelerate said engine output when said control shaft is rotated in said normal direction, and a return spring for urging said output drum to rotate in a direction reverse from said normal direction.

5. An actuator for an automatic cruising system, comprising:
a casing;
a control shaft provided in said casing for rotational movement;
a control motor for driving said control shaft;
an electromagnetic clutch and a reduction gear which are provided between said control motor and said control shaft; and
an external linkage mechanism operatively connected to said control shaft;
wherein said external linkage mechanism comprises an output drum rotatably mounted on said control shaft and adapted to be linked with a governing device for an engine through an output cable;
an input drum rotatably mounted on said control shaft in a position adjacent to said output drum and adapted to be linked with an accelerator device through an input cable;
a set of first engaging means having a first abutting piece radially extending from said control shaft and a first abutting portion provided on said output drum which engage with each other when said control shaft is rotated in a normal direction to accelerate said engine and disengage when said control shaft is rotated in a reverse direction;
a set of second engaging means having a second abutting piece provided on said output drum and a second abutting portion provided on said input drum which engage with each other when said input drum is rotated in said normal direction and disengage when said input drum is rotated in said reverse direction;
a first return spring urging said output drum to rotate in said reverse direction, and
a second return spring urging said input drum to rotate in said reverse direction.

6. The actuator of claim 5, wherein said reduction gear includes, a rotary internal gear, said first return spring is a torsional coil spring and said torsional coil spring is arranged coaxially with said control shaft with one end anchored to said rotary internal gear and another end anchored to said casing.

7. The actuator of claim 5, wherein said second return spring is a spiral spring arranged coaxially with said control shaft and having an end anchored to said casing and another end anchored to said input drum.

8. An actuator for an automatic cruising system, comprising:
a casing;
a control shaft provided in said casing for rotational movement;
a control motor for driving said control shaft;
an input shaft, an electromagnetic clutch and a reduction gear which are provided between said control motor and said control shaft; and
an external linkage mechanism operatively connected to said control shaft;
wherein said reduction gear is a type of Ferguson's mechanism paradox gear having a pinion mounted on said input shaft which is always connected to said control motor; a planetary gear meshing with said pinion so as to revolve around said pinion; a static internal gear meshing with said planetary gear and connected with said electromagnetic clutch for movement to a position restricting rotation of said static internal gear; and
a rotary internal gear fixed on said control shaft and meshed with said planetry gear, said rotatt internal gear having having a number of teeth slightly different from a number of teeth of said static internal gear;
said electromagnetic clutch has a tubular electromagnetic coil coaxially provided around said input shaft and an engaging means for engaging and disengaging with said static internal gear in accordance with on-off operation of said electromagnetic coil; and
said external linkage mechanism comprises an output drum rotatably mounted on said control shaft and adapted to be linked with a governing device for an engine through an output cable;
an input drum rotatably mounted on said control shaft in a position adjacent to said output drum and adapted to be lined with an accelerator device through an input cable;
a set of first engaging means comprising a first abutting piece radially extending from said control shaft and a first abutting portion provided on said output drum which engage with each other when said control shaft is rotated in a normal direction to accelerate said engine and disengage when said control shaft is rotated in a reverse direction;
a set of second engaging means comprising a second abutting piece provided on said output drum and a second abutting portion provided on said input drum which engage with each other when said input drum is rotated in said normal direction and disengage when said input drum is rotated in said reverse direction;
a first return spring urging said output drum to rotate in said reverse direction; and
a second return spring urging said input drum to rotate in said reverse direction.

* * * * *